Sept. 2, 1924.  
B. R. ADKINS ET AL  
CONVEYING APPARATUS  
Filed Aug. 24, 1923  
1,506,961  
3 Sheets-Sheet 3
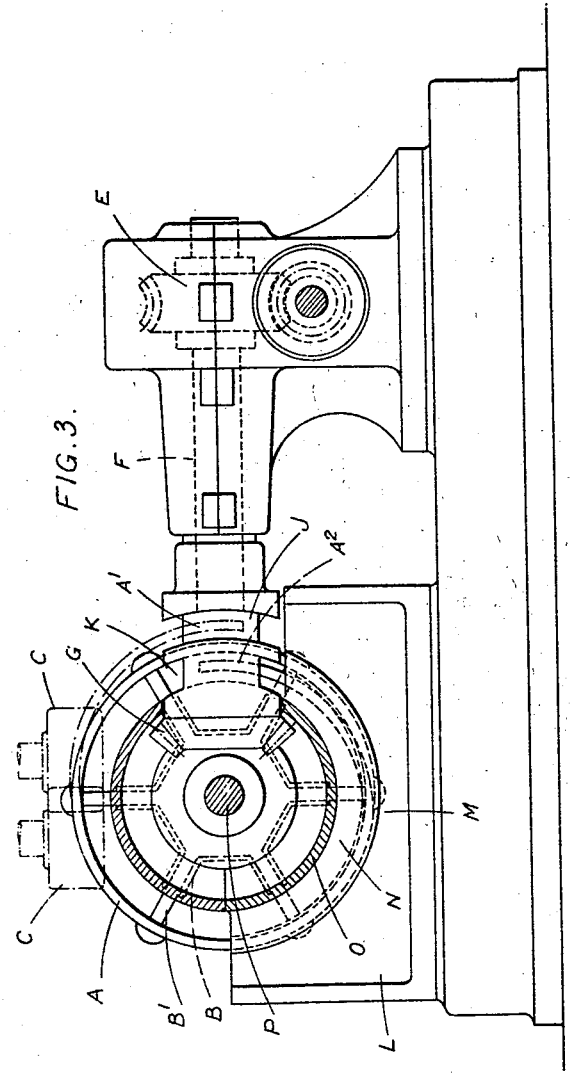

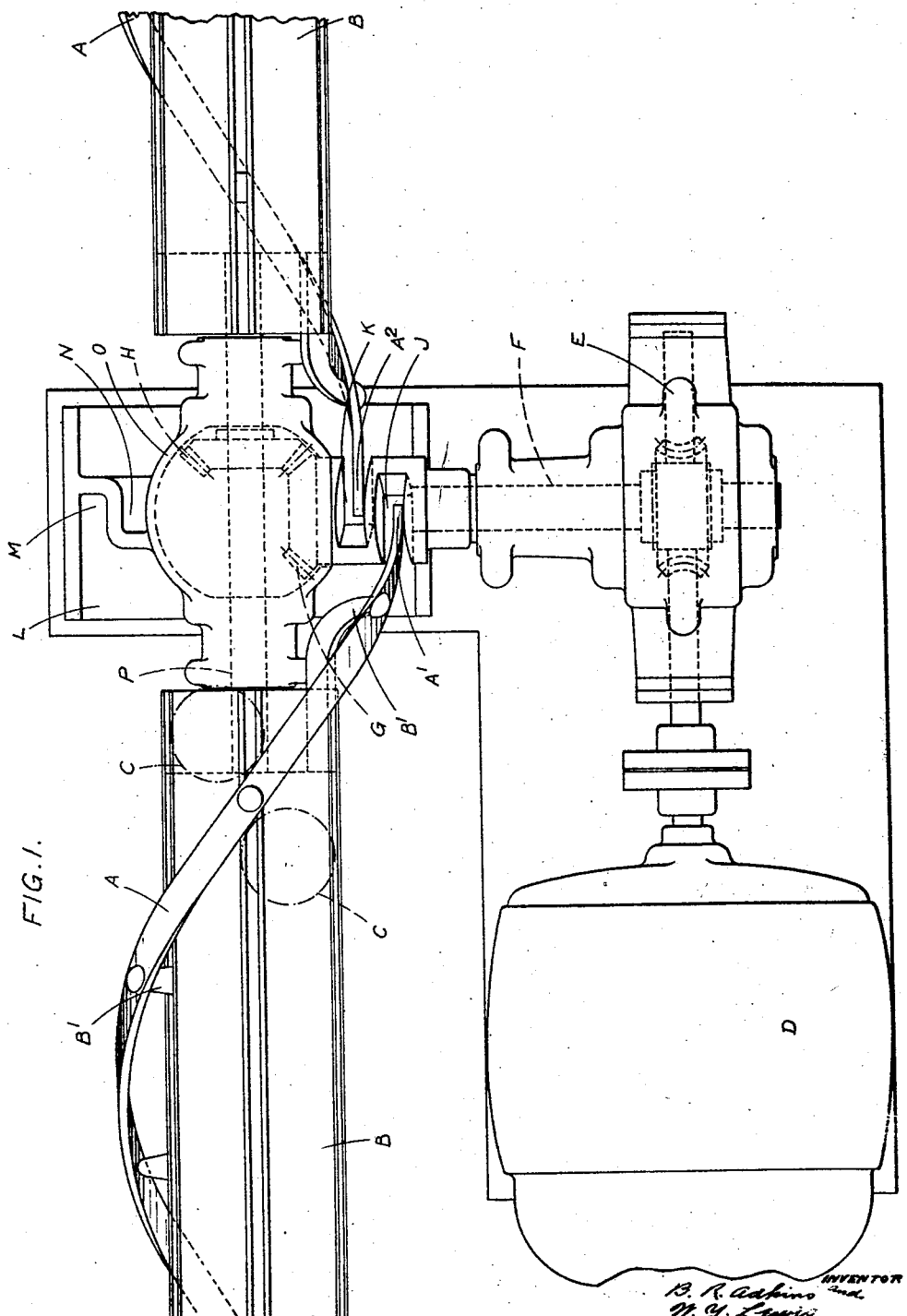

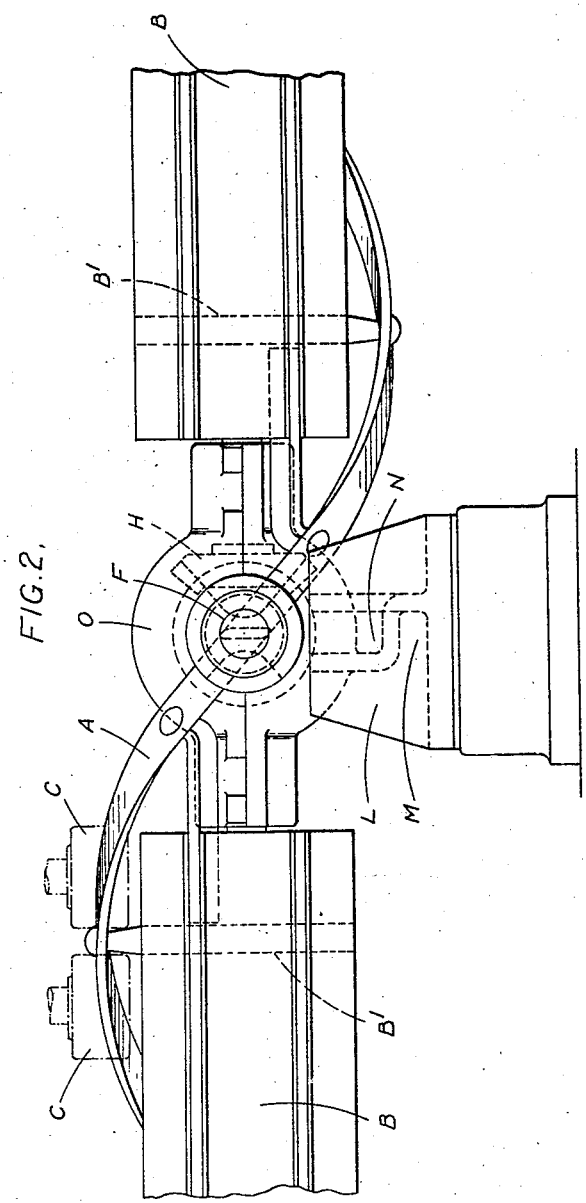

Patented Sept. 2, 1924.

1,506,961

UNITED STATES PATENT OFFICE.

BENJAMIN RATCLIFFE ADKINS, OF UPPER WARLINGHAM, AND WILLIAM YORATH LEWIS, OF SOUTHEND-ON-SEA, ENGLAND.

CONVEYING APPARATUS.

Application filed August 24, 1923. Serial No. 659,187.

*To all whom it may concern:*

Be it known that we, BENJAMIN RATCLIFFE ADKINS and WILLIAM YORATH LEWIS, subjects of the King of England, and residents, respectively, of Upper Warlingham, Surrey, in England, and Southend-on-Sea, Essex, in England, have invented certain new and useful Improvements in Conveying Apparatus, of which the following is a specification.

This invention relates to conveying apparatus of the kind operated by the rotation of a screw whereby motion is imparted to one or more cars, steps, receptacles or other bodies. Hitherto in order to supply power from an external source to an intermediate point in the screw, it has been found necessary to leave a gap or interruption in the screw-thread, the arrangement being such that the cars or the like pass over the gap under their own momentum or are impelled past it by the cars following.

The object of the present invention is to provide a method of transmitting power from an external source to the screw by which such a gap or interruption in the thread is avoided.

In the method according to the present invention the adjacent ends of sections of the screw thread overlap or are so disposed as to present a practically continuous surface, whilst the driving shaft through which the power is supplied is slotted, the revolution speeds of the driving shaft and the screw being so related that the ends of the thread pass through the slots in the shaft as they rotate.

The detail construction of the apparatus employed for carrying out the method according to the invention may be varied, but a preferred arrangement is illustrated by way of example in the accompanying drawings, in which—

Figure 1 is a plan of the apparatus.

Figure 2 is a side elevation of the screw thread, and

Figure 3 is a transverse section, parts being shown in elevation.

The screw thread A is carried by means of posts or studs B' on shafting B which may be built up in sections, as shown in the drawings, or may be of tubular or other suitable construction. A gap is left in the shafting at the intermediate point to which the power is to be supplied. The ends of the thread A, however, project beyond the ends of the shafting B, the end A' of one section being bent slightly outwards from the axis of the shafting so as to overlap the adjacent end $A^2$ of the other section which is bent slightly inwards. The thread thus presents a practically continuous surface to the rollers which are carried beneath the cars or other bodies to engage the thread.

It will be understood that the rollers C C are attached to the under surface of the cars or other bodies which are to be moved by the screw thread A, which cars travel on tracks above the screw thread. Since the invention does not relate to the cars, they have not been disclosed, and the rollers C C have been shown in chain lines merely for the purpose of indicating their position. One roller C is on either side of the screw thread A so that motion can be imparted to the car in either direction.

The power is supplied from an electric or other motor D disposed adjacent to but to one side of the screw, and is transmitted either directly or through suitable gearing E to a driving shaft F arranged transversely to the axis of the screw thread. In the example shown the driving shaft F is disposed at right angles to the axis of the thread, but the shaft may be at an angle to this axis, if desired. The inner end of the driving shaft F carries a bevel G which engages with a bevel H on the end of one portion of the screw-carrying shafting B, these bevels G H preferably being such that the shafting and the screw are rotated at the same speed as the driving shaft F. Alternatively the revolution speed of the driving shaft may, if desired, be arranged to be a direct multiple of that of the screw.

At the position on the driving shaft F which lies in the path of the rotating screw thread A, two slots J K are provided. The arrangement is such that when the ends A' $A^2$ of the thread are approaching the driving shaft, the slots J K in the driving shaft are presented to them, so that they can pass through the slots without touching the shaft. Thus when the bevel gearing is such that the screw and the driving shaft rotate at the same speed, the ends A' $A^2$ of the thread will pass through the slots J and K respectively once during each rotation of the shaft F. If desired, the slots may take the form of cranks so that the shaft F resembles an engine crank shaft.

The bearings on which the shafting is supported may take any suitable form but preferably the bearing standards L are provided with concentric slots or corrugations M N through which the overlapping adjacent ends A' A² of the screw thread pass. These bearing standards L also carry a divided casing O which contains the bevels G H.

The drive may be supplied to one section only of the screw-carrying shafting B or the two sections may be connected, as shown, by means of a shaft P, so that both of them are driven. If it is desired to curve the track at this point, the two sections of shafting will not be coaxial and the connection may conveniently take the form of a ball and socket or universal joint, or alternatively of bevel gearing which is so arranged that the two sections rotate at the same speed.

It will be understood that the arrangement of the slots in the driving shaft may be varied but must be such as to allow the screw thread to present a practically continuous surface. Variations may also be made in the construction and arrangement of parts without departing from the scope of the invention.

What we claim as our invention and desire to secure by Letters Patent is:—

1. In conveying apparatus operated by the rotation of a screw, the combination of the screw thread of which the adjacent ends of two sections overlap so as to present a practically continuous surface, an external source of power, a slotted driving shaft driven from the source of power, and means for transmitting the drive from this shaft to the screw thread such that the ends of the sections of the thread pass through the slots in the shaft as they rotate as set forth.

2. In conveying apparatus operated by the rotation of a screw, the combination of the screw thread of which the adjacent ends of two sections overlap so as to present a practically continuous surface, shafting on which each section of the screw thread is carried, an external source of power, a slotted driving shaft driven from the source of power and arranged transversely to the axis of the screw thread, and gearing through which the drive is transmitted from the shaft to the screw-carrying shafting, the gear ratio of this gearing being such that the revolution speeds of the driving shaft and of the shafting are so related that the ends of the sections of the thread pass through the slots in the shaft as they rotate as set forth.

3. In conveying apparatus operated by the rotation of a screw, the combination of the screw thread of which the adjacent ends of two sections overlap so as to present a practically continuous surface, shafting on which each section of the screw thread is carried, an external source of power, a slotted driving shaft driven from the source of power, and bevel gearing through which the drive is transmitted from the shaft to the screw-carrying shafting, this gearing being such that the driving shaft and the shafting rotate at the same revolution speed whilst the slots in the driving shaft are so positioned that the ends of the sections of the screw thread will pass through them as they rotate as set forth.

4. In conveying apparatus operated by the rotation of a screw, the combination of the screw thread of which the adjacent ends of two sections overlap so as to present a practically continuous surface, shafting on which each section of the screw thread is carried, a spindle rigidly connected to the two sections of shafting, an external source of power, a slotted driving shaft driven from the source of power and arranged transversely to the axis of the screw thread, a bevel wheel mounted on the inner end of the driving shaft, and a second bevel wheel engaging therewith and mounted on the spindle connecting the sections of shafting, these two bevel wheels having the same number of teeth so that they rotate at the same revolution speed, the slots in the driving shaft being so positioned that the ends of the sections of the screw thread will pass through them as they rotate as set forth.

5. In conveying apparatus operated by the rotation of a screw, the combination of the screw thread of which the adjacent ends of two sections overlap so as to present a practically continuous surface, shafting on which each section of the screw thread is carried, a spindle rigidly connected to the two sections of shafting, an external source of power, a slotted driving shaft driven from the source of power and arranged transversely to the axis of the screw thread, a bevel wheel mounted on the inner end of the driving shaft, a second bevel wheel engaging therewith and mounted on the spindle connecting the sections of shafting, the numbers of teeth in the two bevel wheels being so related that the ends of the sections of the screw thread will pass through the slots in the driving shaft as they rotate, a casing enclosing the bevel wheels, and a pedestal on which the casing is supported, this pedestal having curved slots through which the ends of the screw tread pass as they rotate as set forth.

In testimony whereof we have signed our names to this specification.

BENJAMIN RATCLIFFE ADKINS.
WILLIAM YORATH LEWIS.